United States Patent
Ogawa et al.

(10) Patent No.: US 10,663,582 B2
(45) Date of Patent: May 26, 2020

(54) DETECTION DEVICE, DETECTION METHOD, AND STORAGE MEDIUM

(71) Applicant: Panasonic Intellectual Property Management Co., Ltd., Osaka (JP)

(72) Inventors: Shinya Ogawa, Kanagawa (JP); Takashi Yoshida, Kanagawa (JP); Toru Ichikawa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/331,190

(22) PCT Filed: Sep. 26, 2017

(86) PCT No.: PCT/JP2017/034610
§ 371 (c)(1),
(2) Date: Mar. 7, 2019

(87) PCT Pub. No.: WO2018/062120
PCT Pub. Date: Apr. 5, 2018

(65) Prior Publication Data
US 2019/0277967 A1    Sep. 12, 2019

(30) Foreign Application Priority Data

Sep. 30, 2016   (JP) ................................. 2016-194587

(51) Int. Cl.
*G01S 15/931* (2020.01)
*G01S 7/526* (2006.01)
(Continued)

(52) U.S. Cl.
CPC ............ *G01S 15/931* (2013.01); *B60R 21/00* (2013.01); *G01S 7/524* (2013.01); *G01S 7/526* (2013.01); *G01S 15/04* (2013.01); *G01S 15/93* (2013.01)

(58) Field of Classification Search
CPC .............................. G01S 15/931; G01S 15/12
(Continued)

(56) References Cited

U.S. PATENT DOCUMENTS

2009/0009306 A1* 1/2009 Magane ................ G01S 15/931
                                                              340/435
2012/0275263 A1* 11/2012 Kloss ................... G01S 7/52004
                                                              367/13
2014/0328142 A1* 11/2014 Yamada ................ G01S 7/526
                                                              367/99

FOREIGN PATENT DOCUMENTS

JP          3-243413        10/1991
JP          2009-014560     1/2009

OTHER PUBLICATIONS

International Search Report of PCT application No. PCT/JP2017/034610 dated Nov. 7, 2017.

* cited by examiner

*Primary Examiner* — Qutbuddin Ghulamali
(74) *Attorney, Agent, or Firm* — Greenblum & Bernstein, P.L.C.

(57) ABSTRACT

A detection device includes a transmitter, an extraction unit, and a detector. The transmitter causes an ultrasonic sensor used in a vehicle to successively transmit a first transmission wave of a first frequency and a second transmission wave of a second frequency. The extraction unit extracts a frequency component from a reflected wave received by the ultrasonic sensor, the reflected wave having a reception level greater than a predetermined threshold. The detector detects an (Continued)

obstacle based on an extraction result of the component of the frequency. An amplitude level of the second transmission wave is greater than an amplitude level of the first transmission wave. The amplitude level of the first transmission wave is set to make the reception level of the reflected wave of the first transmission wave from a road surface less than or equal to the predetermined threshold. The amplitude level of the second transmission wave is set to make the reception level of the reflected wave of the second transmission wave from a partial area of the road surface greater than the predetermined threshold.

15 Claims, 11 Drawing Sheets

(51) Int. Cl.
*G01S 15/04* (2006.01)
*G01S 7/524* (2006.01)
*B60R 21/00* (2006.01)
*G01S 15/93* (2020.01)

(58) Field of Classification Search
USPC .......................................................... 367/93
See application file for complete search history.

DETECTION DEVICE, DETECTION METHOD, AND STORAGE MEDIUM

CROSS-REFERENCE TO RELATED APPLICATIONS

This application is a U.S. national stage application of the PCT International Application No. PCT/JP2017/034610 filed on Sep. 26, 2017, which claims the benefit of foreign priority of Japanese patent application No. 2016-194587 filed on Sep. 30, 2016, the contents all of which are incorporated herein by reference.

TECHNICAL FIELD

The present disclosure relates to a detection device, a detection method, and a detection program for detecting an obstacle.

BACKGROUND ART

Conventionally, there are known obstacle detection devices that each detect an obstacle existing rearward of a vehicle such as an automobile by using an ultrasonic sensor (sonar) mounted on a rear portion of the vehicle. The ultrasonic sensor transmits an ultrasonic wave (transmission wave) rearward of the vehicle. The obstacle detection device receives a reflected wave obtained by the ultrasonic wave hitting the obstacle and being reflected, and detects the obstacle based on the reflected wave.

In such an obstacle detection device, when extending a distance of coverage of the transmission wave, it is considered to enlarge a transmission wave voltage gain. However, when the transmission wave voltage gain is enlarged, the transmission wave hits a road surface and is reflected, and the obstacle detection device erroneously detects an obstacle on the road surface based on the reflected wave only from the road surface.

Therefore, for example, PTL 1 discloses a technique to detect an obstacle existing on a road surface by comparing an average of a reflected wave from the road surface where the obstacle exists with an average of the reflected wave only from the road surface.

CITATION LIST

Patent Literature

PTL 1: Unexamined Japanese Patent Publication No. H3-243413.

SUMMARY OF THE INVENTION

The present disclosure provides a detection device, a detection method, and a detection program that can detect an obstacle in a wider range and detect an obstacle on a road surface accurately.

A detection device according to the present disclosure includes a transmitter, an extraction unit, and a detector. The transmitter causes an ultrasonic sensor used in a vehicle to transmit a first transmission wave of a first frequency, and then to transmit a second transmission wave of a second frequency different from the first frequency before the ultrasonic sensor receives a reflected wave of the first transmission wave. The extraction unit extracts a component of a frequency from the reflected wave received by the ultrasonic sensor, the reflected wave having a reception level greater than a predetermined threshold. The detector detects an obstacle based on an extraction result of the component of the frequency. An amplitude level of the second transmission wave is greater than an amplitude level of the first transmission wave. The amplitude level of the first transmission wave is set to make the reception level of the reflected wave of the first transmission wave from a road surface less than or equal to the predetermined threshold. The amplitude level of the second transmission wave is set to make the reception level of the reflected wave of the second transmission wave from a partial area of the road surface greater than the predetermined threshold.

A detection method according to the present disclosure includes a transmission step, an extraction step, and a detection step. In the transmission step, an ultrasonic sensor used in a vehicle is caused to transmit a first transmission wave of a first frequency, and then to transmit a second transmission wave of a second frequency different from the first frequency before the ultrasonic sensor receives a reflected wave of the first transmission wave. In the extraction step, a component of a frequency is extracted from the reflected wave received by the ultrasonic sensor, the reflected wave having a reception level greater than a predetermined threshold. In the detection step, an obstacle is detected based on an extraction result of the component of the frequency. An amplitude level of the second transmission wave is greater than an amplitude level of the first transmission wave. The amplitude level of the first transmission wave is set to make the reception level of the reflected wave of the first transmission wave from a road surface less than or equal to the predetermined threshold. The amplitude level of the second transmission wave is set to make the reception level of the reflected wave of the second transmission wave from a partial area of the road surface greater than the predetermined threshold.

A detection program according to the present disclosure causes a computer to execute transmission processing, extraction processing, and detection processing. In the transmission processing, an ultrasonic sensor used in a vehicle is caused to transmit a first transmission wave of a first frequency, and then to transmit a second transmission wave of a second frequency different from the first frequency before the ultrasonic sensor receives a reflected wave of the first transmission wave. In the extraction processing, a component of a frequency is extracted from the reflected wave received by the ultrasonic sensor, the reflected wave having a reception level greater than a predetermined threshold. In the detection processing, an obstacle is detected based on an extraction result of the component of the frequency. An amplitude level of the second transmission wave is greater than an amplitude level of the first transmission wave. The amplitude level of the first transmission wave is set to make the reception level of the reflected wave of the first transmission wave from a road surface less than or equal to the predetermined threshold. The amplitude level of the second transmission wave is set to make the reception level of the reflected wave of the second transmission wave from a partial area of the road surface greater than the predetermined threshold.

Note that modifications of aspects of the present disclosure modified between method, device, recording medium (including computer-readable non-transient recording medium), computer program, or the like are also effective as the aspects of the present disclosure.

The present disclosure allows detection of an obstacle in a wider range and detection of an obstacle on the road surface accurately.

DESCRIPTION OF EMBODIMENT

Prior to describing an exemplary embodiment of the present disclosure, a problem found in a conventional technique will be briefly described herein. With the technique of PTL 1, when an average of a reflected wave from a road surface where an obstacle exists and an average of the reflected wave only from the road surface are equivalent, there is a possibility that the obstacle may be undetectable.

Hereinafter, the exemplary embodiment of the present disclosure will be described with reference to the drawings.

Figure 1:
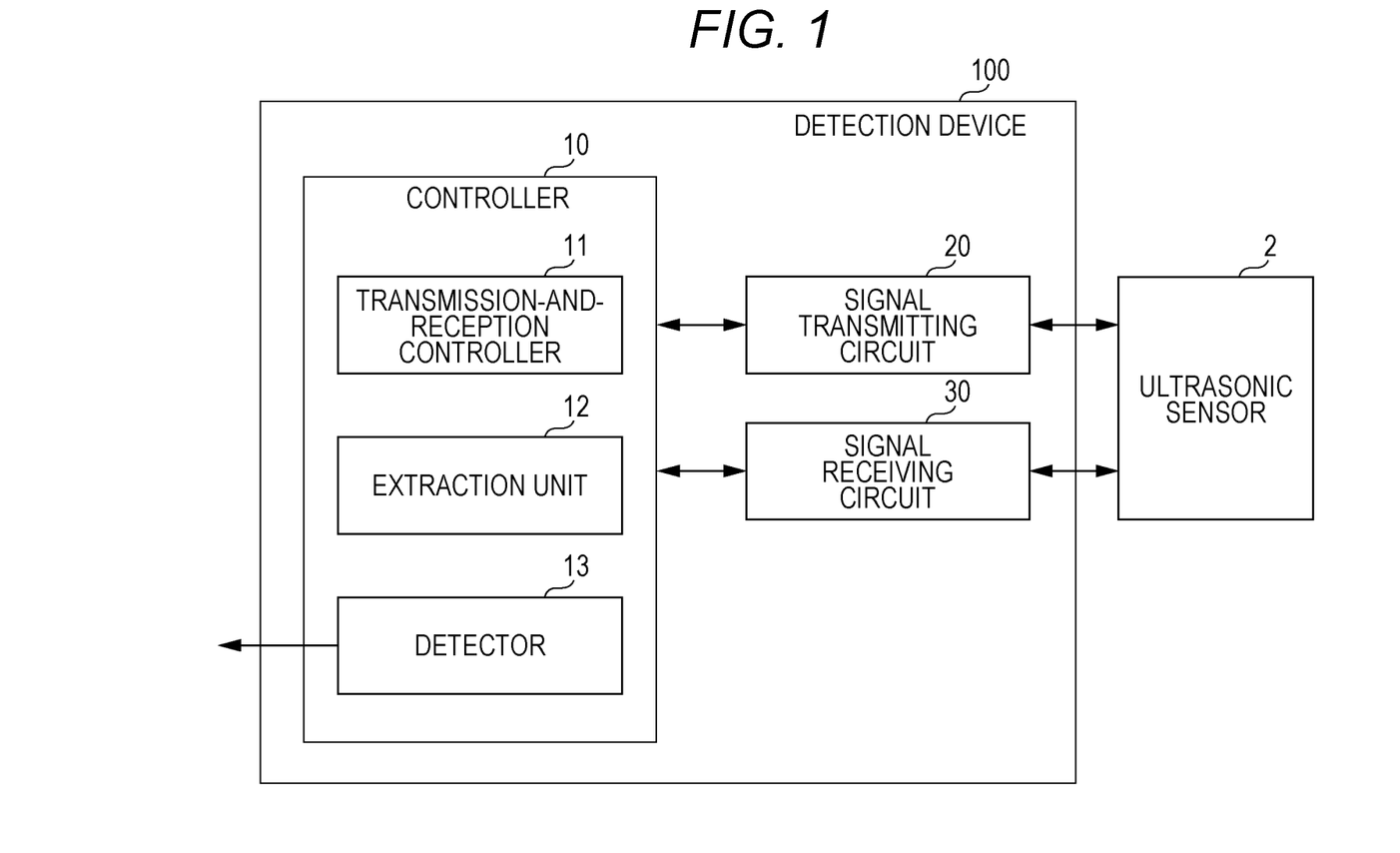
FIG. 1 is a block diagram illustrating a configuration example of a detection device according to an exemplary embodiment of the present disclosure.

First, a configuration of detection device 100 according to the exemplary embodiment of the present disclosure will be described with reference to FIG. 1. FIG. 1 is a diagram illustrating a configuration example of detection device 100 according to the present exemplary embodiment.

Figure 2:
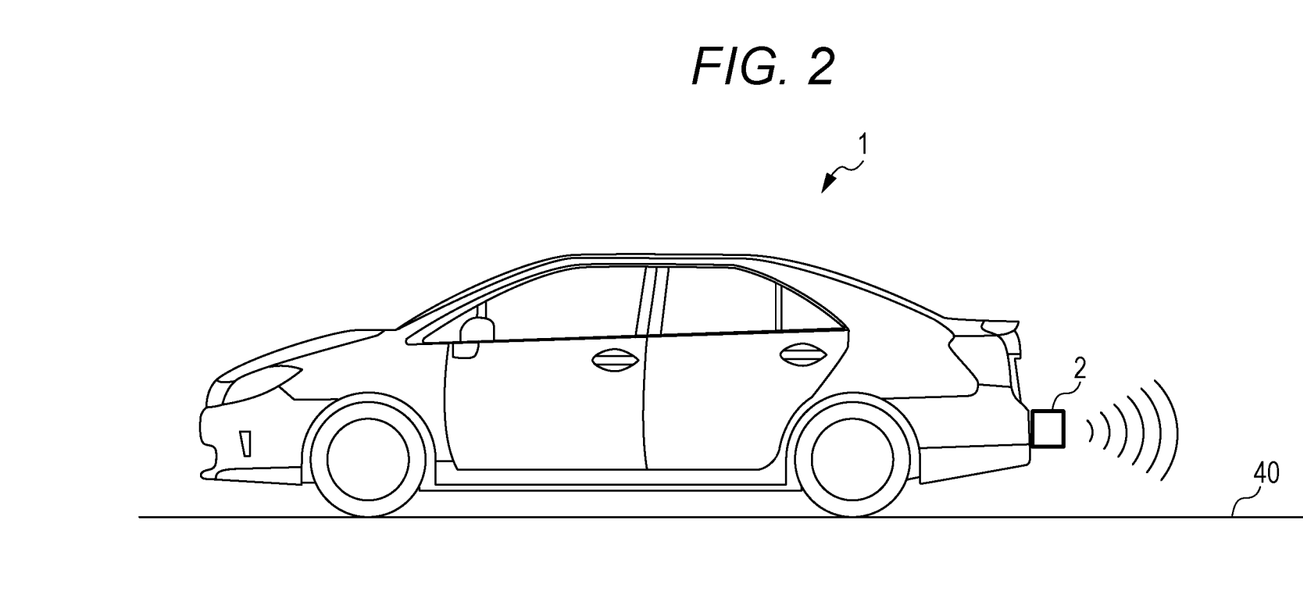
FIG. 2 is a diagram illustrating one example of a mounting position of an ultrasonic sensor illustrated in FIG. 1.

Detection device 100 illustrated in FIG. 1 is mounted on a vehicle such as an automobile (refer to FIG. 2), and is electrically connected to ultrasonic sensor 2 mounted on the same vehicle. Ultrasonic sensor 2 is attached, for example, to a rear portion of vehicle 1 (for example, near a rear damper) as illustrated in FIG. 2.

Ultrasonic sensor 2 transmits an ultrasonic wave (hereinafter referred to as a transmission wave) rearward of vehicle 1. The transmission wave hits road surface 40 and is reflected. When an obstacle exists on road surface 40 rearward of vehicle 1, the transmission wave hits the obstacle (for example, an object such as a wall and a curbstone, or a creature such as a human and an animal) and is reflected. Ultrasonic sensor 2 receives the ultrasonic wave reflected in this way (hereinafter referred to as a reflected wave). Note that the transmission wave will be described later with reference to FIG. 3A and FIG. 3B. The reflected wave will be described later with reference to FIG. 5B, FIG. 6B, and FIG. 7B.

As illustrated in FIG. 1, detection device 100 includes controller 10, signal transmitting circuit 20, and signal receiving circuit 30. Detection device 100 is, for example, an ultrasonic distance measurement electronic control unit (ECU).

Controller 10 includes transmission-and-reception controller 11, extraction unit 12, and detector 13. Controller 10 includes, not illustrated in the figure, for example, a central processing unit (CPU), a storage medium such as a read only memory (ROM) storing a control program, a working memory such as a random access memory (RAM), and a communication circuit. Functions of transmission-and-reception controller 11, extraction unit 12, and detector 13 illustrated in FIG. 1 (details will be described later) are implemented by the CPU executing the control program. Instead of the functions of controller 11, extraction unit 12, and detector 13 being implemented by the CPU executing the control program, the functions may be implemented as dedicated circuits such as a control circuit, an extraction unit circuit, and a detection circuit.

Transmission-and-reception controller 11 (one example of transmitter) controls signal transmitting circuit 20 to transmit successive transmission wave T (refer to FIG. 3A) to be described later from ultrasonic sensor 2. For example, transmission-and-reception controller 11 outputs a control signal to each of signal transmitting circuit 20 and signal receiving circuit 30. The control signal that is output to signal transmitting circuit 20 includes, for example, an instruction on a transmission wave voltage gain (also referred to as a transmission gain). The control signal that is output to signal receiving circuit 30 includes, for example, an instruction on a reception wave signal gain (also referred to as a reception gain).

Extraction unit 12 performs Fourier transformation and the like on the reception signal received from signal receiving circuit 30 (details will be described later), and extracts a frequency component (hereinafter simply referred to as a "component").

Detector 13 detects the obstacle based on the frequency of the extracted frequency component. Specific examples of this detection processing (first to third detection examples to be described later) will be described later.

Signal transmitting circuit 20 includes, for example, an oscillating circuit (not illustrated) and a drive circuit (not illustrated). The oscillating circuit generates a square wave of a predetermined frequency (refer to FIG. 3A). The drive circuit outputs the generated square wave to ultrasonic sensor 2 as a drive signal. This causes ultrasonic sensor 2 to transmit the transmission wave at the transmission wave voltage gain set in advance.

Signal receiving circuit 30 includes an amplifying circuit (not illustrated) and a filter circuit (not illustrated). The amplifying circuit amplifies the reflected wave received from ultrasonic sensor 2 (reception signal) at the reception wave signal gain set in advance. The filter circuit filters the amplified reception signal, and subsequently outputs the reception signal to controller 10.

The configuration of detection device 100 has been described above.

Figure 3A:
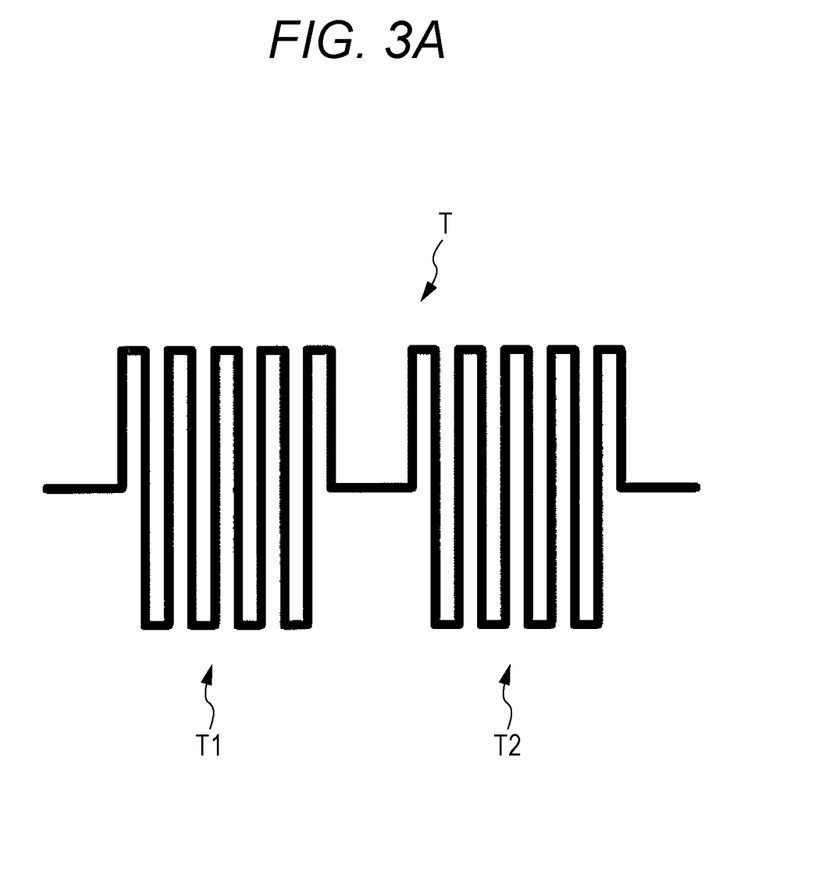
FIG. 3A is a diagram illustrating one example of a successive transmission wave according to the exemplary embodiment of the present disclosure.
Figure 3B:
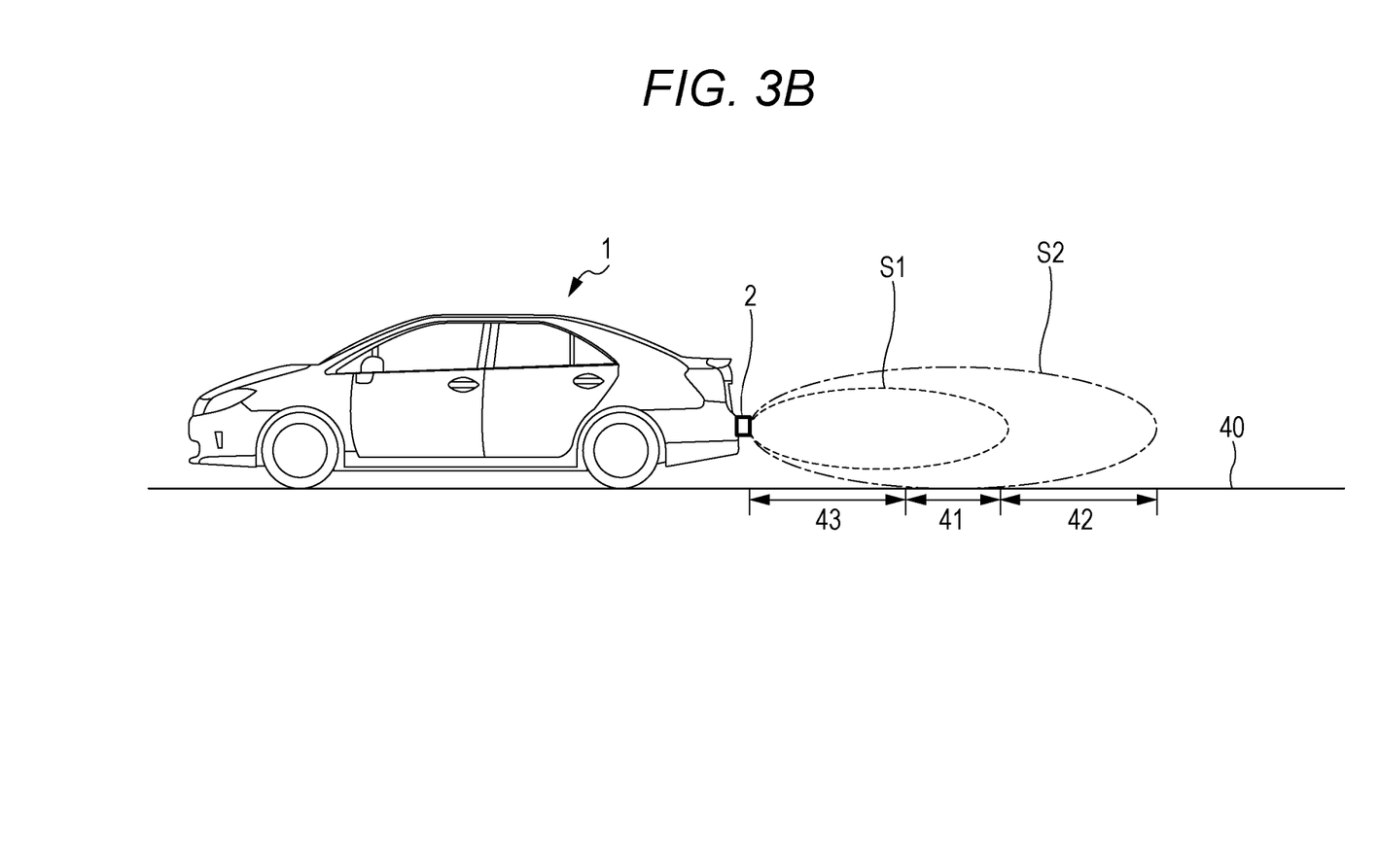
FIG. 3B is a conceptual diagram illustrating one example of coverage of the successive transmission wave illustrated in FIG. 3A.

Next, the transmission wave according to the exemplary embodiment of the present disclosure will be described with reference to FIG. 3A and FIG. 3B. FIG. 3A is a diagram illustrating successive transmission wave T of the present exemplary embodiment. FIG. 3B is a conceptual diagram illustrating coverage of each of transmission wave T1 and transmission wave T2 included in successive transmission wave T.

As illustrated in FIG. 3A, successive transmission wave T includes transmission wave T1 (one example of a first transmission wave) and transmission wave T2 (one example of a second transmission wave). Ultrasonic sensor 2 transmits transmission wave T1, and subsequently, before ultrasonic sensor 2 receives the reflected wave of transmission wave T1, ultrasonic sensor 2 transmits transmission wave T2. Transmission wave T1 differs from transmission wave T2 in frequency. Hereinafter, the frequency of transmission wave T1 is referred to as "frequency A", and the frequency of transmission wave T2 is referred to as "frequency B". Note that the frequency of the transmission wave may not be a fixed frequency, but the frequency of the transmission wave may have a bandwidth and the frequency may change gradually.

In FIG. 3B, coverage S1 indicates coverage of transmission wave T1, and coverage S2 indicates coverage of transmission wave T2.

As illustrated in FIG. 3B, coverage S2 is wider (longer) than coverage S1. That is, an amplitude level (transmission level) of transmission wave T2 is greater than an amplitude level (transmission level) of transmission wave T1.

Also, as illustrated in FIG. 3B, coverage S2 includes area 41 on road surface 40 (one example of partial area). Therefore, since transmission wave T2 reaches area 41, ultrasonic sensor 2 receives at least the reflected wave from area 41.

The amplitude level of transmission wave T2 is set such that a reception level of the reflected wave from area 41 is larger than a predetermined threshold (including zero, the same applies hereinafter). The amplitude level of transmission wave T1 is set such that the reception level of the reflected wave of transmission wave T1 from road surface 40 is less than or equal to the predetermined threshold.

Note that in the present exemplary embodiment, the reflected wave with the reception level greater than the predetermined threshold undergoes extraction processing of the frequency component by extraction unit 12. On the other hand, the reflected wave with the reception level less than or equal to the predetermined threshold does not undergo the extraction processing of the frequency component by extraction unit 12. Alternatively, the extraction processing of all the frequency components including a minute level of the reflected wave may be performed, and determination may be made depending on signal strength of the extracted components.

A distance between ultrasonic sensor 2 and area 41 is already known to detection device 100 (for example, detector 13). Therefore, detection device 100 can recognize whether the reflected wave is a reflected wave from area 41, from time when the reflected wave is received.

As illustrated in FIG. 3B, coverage S1 does not include area 41 on road surface 40. Therefore, transmission wave T1 does not reach area 41. Note that in the present exemplary embodiment, "does not reach" not only means that the transmission wave does not actually reach the predetermined area, but also means that the transmission wave reaches the predetermined area but the reception level of the reflected wave of the transmission wave is less than or equal to the predetermined threshold.

In FIG. 3B, area 42 is an area farther from vehicle 1 than area 41 on road surface 40 is. Area 43 is an area closer to vehicle 1 than area 41 on road surface 40 is. Transmission wave T1 and transmission wave T2 reach neither area 42 nor area 43.

Note that the area on road surface 40 can be divided into area 42 far from the vehicle, area 43 close to the vehicle, and intermediate area 41. Intermediate area 41 (one example of a "partial area") is an area where the reception level of the reflected wave of transmission wave T2 from road surface 40 is greater than the predetermined threshold. Area 42 far from the vehicle is an area of road surface 40 positioned farther from vehicle 1 than intermediate area 41 is and below coverage S2 of transmission wave T2. Area 43 close to the vehicle is an area of road surface 40 closer to vehicle 1 than intermediate area 41 is and behind vehicle 1.

Successive transmission wave T has been described above.

Figure 4:
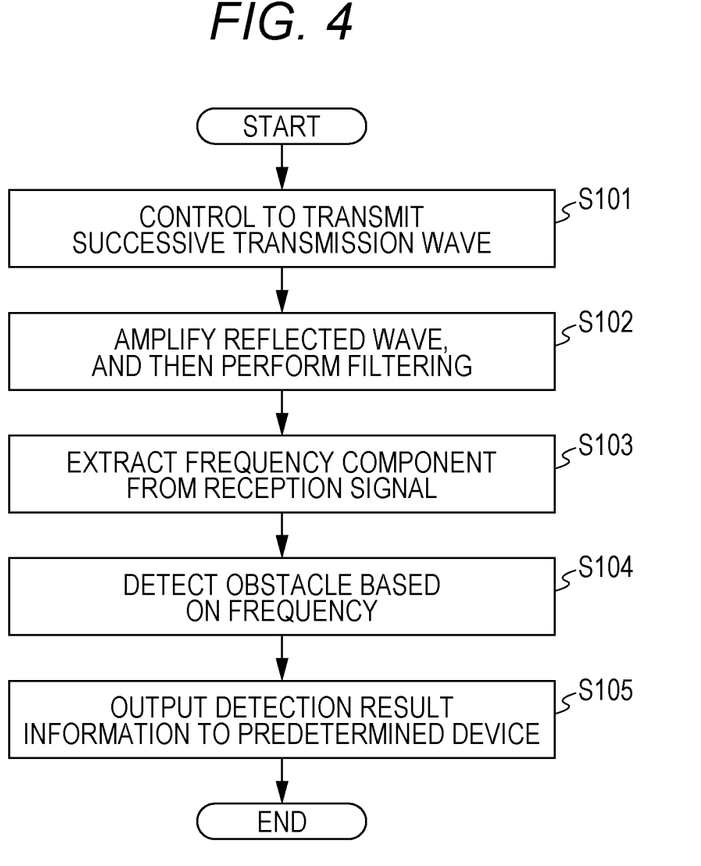
FIG. 4 is a flowchart illustrating an operation example of the detection device according to the exemplary embodiment of the present disclosure.

Next, an operation of detection device 100 will be described with reference to FIG. 4. FIG. 4 is a flowchart illustrating an operation example of detection device 100.

First, signal transmitting circuit 20 controls ultrasonic sensor 2 to transmit successive transmission wave T illustrated in FIG. 3A (step S101). Accordingly, ultrasonic sensor 2 transmits successive transmission wave T rearward of vehicle 1. As illustrated in FIG. 3B, transmission wave T1 is transmitted to coverage S1, and transmission wave T2 is transmitted to coverage S2.

Next, signal receiving circuit 30 amplifies the reflected wave (reception signal) received from ultrasonic sensor 2 and performs filtering (step S102). Subsequently, signal receiving circuit 30 outputs the reception signal to controller 10.

Next, extraction unit 12 of controller 10 performs Fourier transformation and the like on the reception signal, and extracts the frequency component. Specifically, extraction unit 12 performs Fourier transformation and the like on the reception signal and extracts the component of frequency A and the component of frequency B. Then, when signal strength of the extracted component of frequency A is greater than the predetermined threshold, extraction unit 12 determines that the component of frequency A is detected. Similarly, when signal strength of the extracted component of frequency B is greater than the predetermined threshold, extraction unit 12 determines that the component of frequency B is detected (step S103). Note that when vehicle 1 is moving with respect to road surface 40, the frequency of the reflected wave shifts by the Doppler effect. Therefore, when the Doppler effect cannot be neglected, in step S103, instead of the component of frequency A, a component of a frequency range including frequency A and taking this Doppler effect into consideration may be extracted. Similarly, instead of the component of frequency B, a component of a frequency range including frequency B and taking this Doppler effect into consideration may be extracted.

Next, detector 13 of controller 10 detects the obstacle based on the frequency of the extracted frequency component. Specifically, detector 13 determines whether the obstacle exists based on extraction of the component of frequency A or a detection result in extraction unit 12, and extraction of the component of frequency B or the detection result (step S104).

Figure 5A:
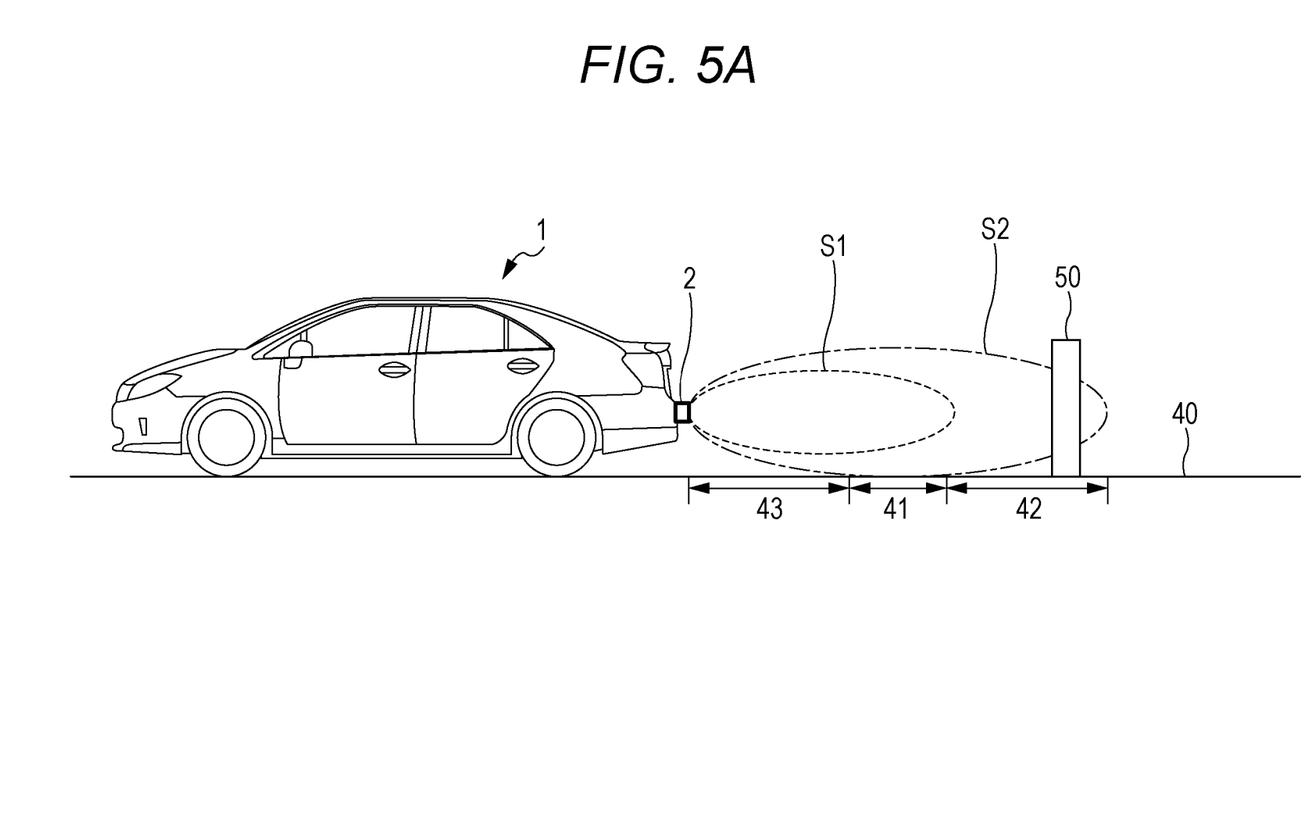
FIG. 5A is a diagram illustrating a position of an obstacle in a first detection example.
Figure 5B:
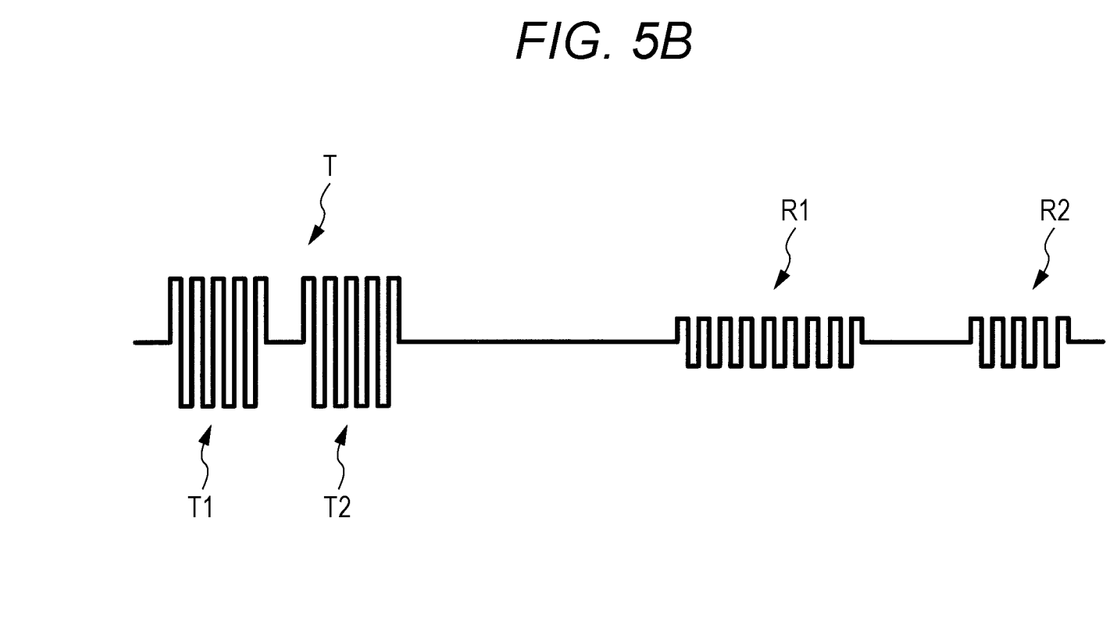
FIG. 5B is a diagram illustrating the successive transmission wave and a reflected wave in the first detection example.
Figure 6A:
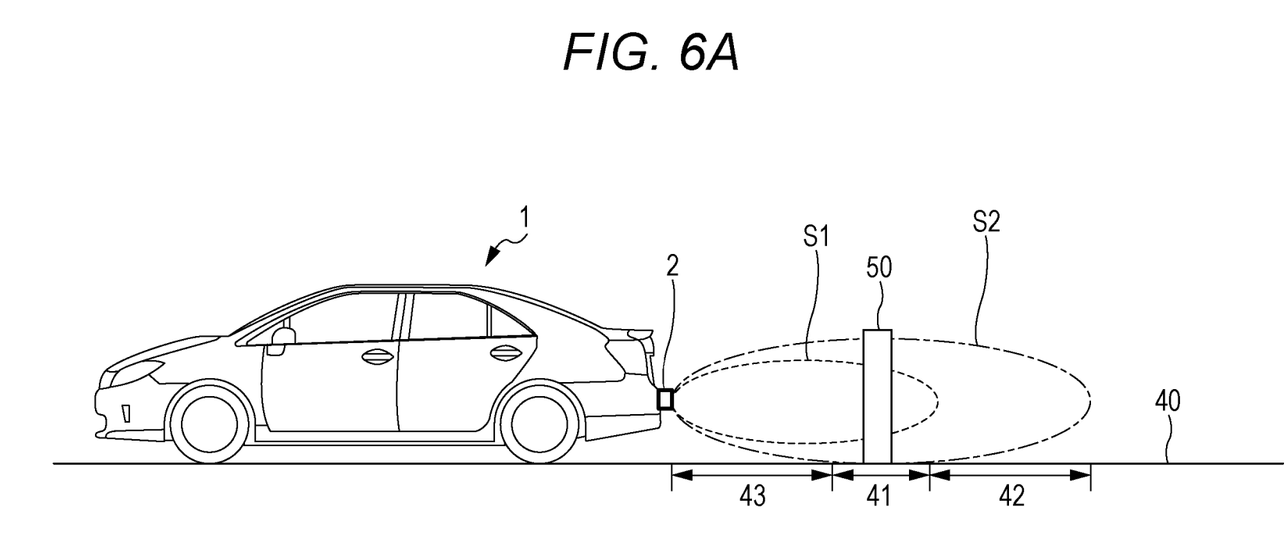
FIG. 6A is a diagram illustrating the position of the obstacle in a second detection example.
Figure 6B:
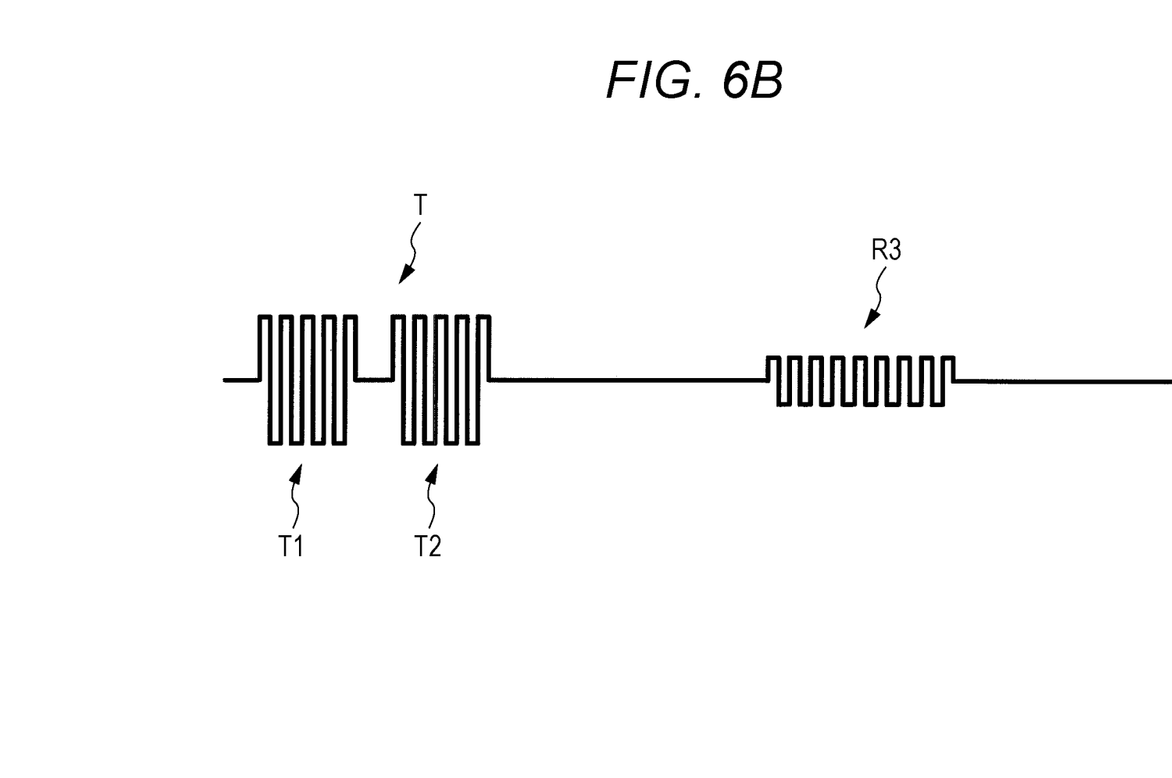
FIG. 6B is a diagram illustrating the successive transmission wave and the reflected wave in the second detection example.
Figure 7A:
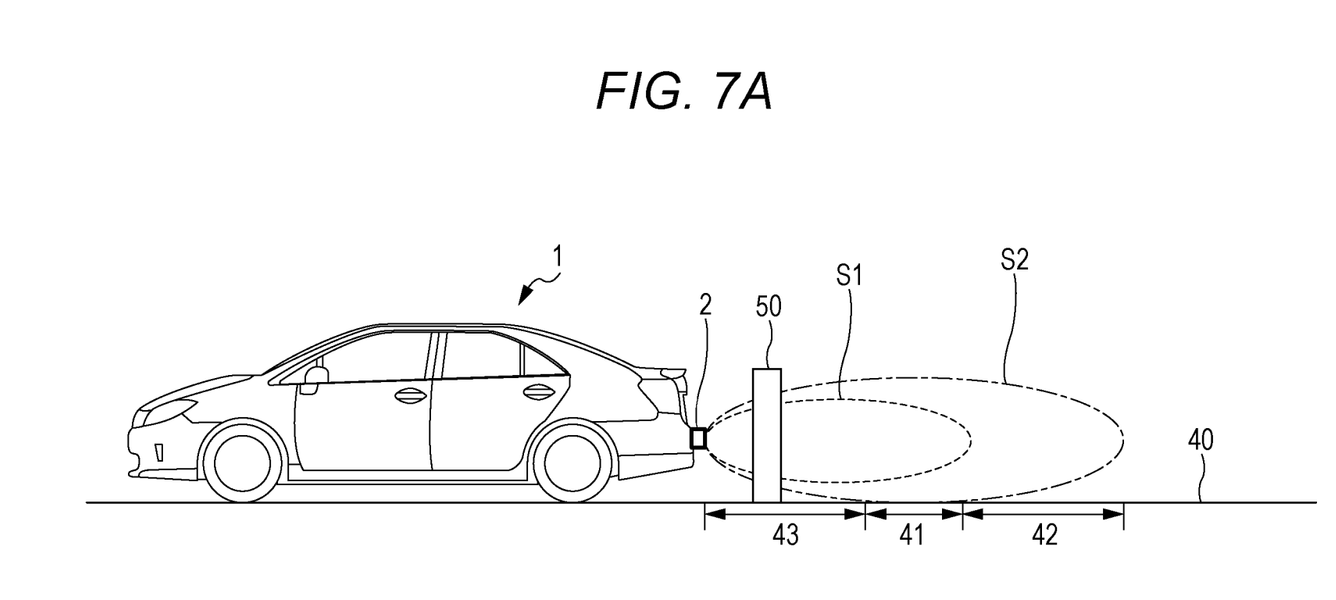
FIG. 7A is a diagram illustrating the position of the obstacle in a third detection example.
Figure 7B:
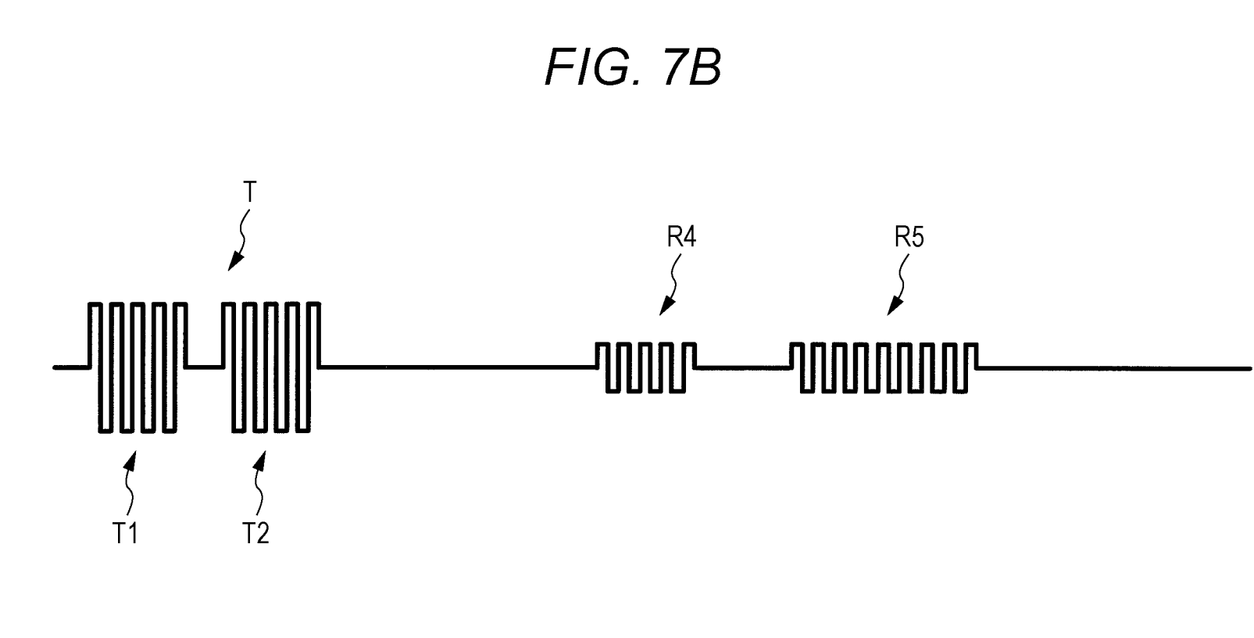
FIG. 7B is a diagram illustrating the successive transmission wave and the reflected wave in the third detection example.

Here, as a specific example of the detection processing of step S104, first to third detection examples will be described. FIG. 5A is a diagram illustrating the position of the obstacle in the first detection example, and FIG. 5B is a diagram illustrating the successive transmission wave and the reflected wave in the first detection example. FIG. 6A is a diagram illustrating the position of the obstacle in the second detection example, and FIG. 6B is a diagram illustrating the successive transmission wave and the reflected wave in the second detection example. FIG. 7A is a diagram illustrating the position of the obstacle in the third detection example, and FIG. 7B is a diagram illustrating the successive transmission wave and the reflected wave in the third detection example.

First, the first detection example will be described with reference to FIG. 5A and FIG. 5B.

For example, as illustrated in FIG. 5A, it is assumed that obstacle 50 exists in area 42 and part of obstacle 50 is included in coverage S2.

In this case, as illustrated in FIG. 5B, ultrasonic sensor 2 first receives reflected wave R1, and subsequently receives reflected wave R2. It is assumed that the reception levels of reflected wave R1 and reflected wave R2 are greater than the predetermined threshold.

Then, in step S103 of FIG. 4, Fourier transformation is performed by extraction unit 12 on each of reflected wave R1 and reflected wave R2, and only the component of frequency B is extracted from each of reflected wave R1 and reflected wave R2.

Detector 13 can recognize that, as described above, reflected wave R1 is a reflected wave from area 41. Also, since only the component of frequency B is extracted from reflected wave R1, detector 13 recognizes reflected wave R1 as being reflected by only area 41. Therefore, detector 13 determines that obstacle 50 does not exist in area 41.

Also, since reflected wave R2 is received after reflected wave R1 and the component of frequency B is extracted from reflected wave R2, detector 13 determines that obstacle 50 exists in area 42.

Also, since the reflected wave is not received before reflected wave R1, detector 13 determines that obstacle 50 does not exist in area 43.

The first detection example has been described above.

Next, the second detection example will be described with reference to FIG. 6A and FIG. 6B.

For example, as illustrated in FIG. 6A, it is assumed that obstacle 50 exists in area 41, and that part of obstacle 50 is included in both coverage S1 and coverage S2.

In this case, ultrasonic sensor 2 receives reflected wave R3, as illustrated in FIG. 6B. Reflected wave R3 is a mixed wave including the reflected wave obtained by transmission wave T1 reaching obstacle 50 and being reflected, the reflected wave obtained by transmission wave T2 reaching obstacle 50 and being reflected, and the reflected wave obtained by transmission wave T2 reaching area 41 and being reflected. It is assumed that the reception level of each reflected wave included in this mixed wave is greater than the predetermined threshold. Therefore, the reception level of reflected wave R3 is greater than the predetermined threshold.

Then, in step S103 of FIG. 4, Fourier transformation is performed by extraction unit 12 on reflected wave R3, and in the reflected wave, both the component of frequency A and the component of frequency B are extracted from R3.

Detector 13 can recognize that reflected wave R3 is a reflected wave from area 41. Also, since both the component of frequency A and the component of frequency B are extracted from reflected wave R3, detector 13 recognizes that reflected wave R3 includes not only what is reflected by area 41 but also what is reflected by obstacle 50. Therefore, detector 13 determines that obstacle 50 exists in area 41.

Also, since no reflected wave is received after reflected wave R3, detector 13 determines that obstacle 50 does not exist in area 42. However, another obstacle that can exist on a straight line connecting vehicle 1 and obstacle 50 and rearward of obstacle 50 is outside of a target of determination here.

Also, since no reflected wave is received before reflected wave R3, detector 13 determines that obstacle 50 does not exist in area 43.

The second detection example has been described above.

Next, the third detection example will be described with reference to FIG. 7A and FIG. 7B.

For example, as illustrated in FIG. 7A, it is assumed that obstacle 50 exists in area 43, and that part of obstacle 50 is included in both coverage S1 and coverage S2.

In this case, as illustrated in FIG. 7B, ultrasonic sensor 2 first receives reflected wave R4, and subsequently receives reflected wave R5. It is assumed that the reception levels of reflected wave R4 and reflected wave R5 are greater than the predetermined threshold.

Then, in step S103 of FIG. 4, Fourier transformation is performed by extraction unit 12 on each of reflected wave R4 and reflected wave R5, both the component of frequency A and the component of frequency B are extracted from reflected wave R4, and only the component of frequency B is extracted from reflected wave R5.

Since reflected wave R4 is received before reflected wave R5 and both the component of frequency A and the component of frequency B are extracted from reflected wave R4, detector 13 recognizes reflected wave R4 as being reflected by obstacle 50. Therefore, detector 13 determines that obstacle 50 exists in area 43.

Also, detector 13 can recognize that reflected wave R5 is a reflected wave from area 41. Also, since only the component of frequency B is extracted from reflected wave R5, detector 13 recognizes reflected wave R5 as being reflected by only area 41. Therefore, detector 13 determines that obstacle 50 does not exist in area 41. However, another obstacle that can exist on a straight line connecting vehicle 1 and obstacle 50 and rearward of obstacle 50 is outside of a target of determination here.

Also, since the reflected wave is not received after reflected wave R5, detector 13 determines that obstacle 50 does not exist in area 42. However, another obstacle that can exist on a straight line connecting vehicle 1 and obstacle 50 and rearward of obstacle 50 is outside of a target of determination here.

The third detection example has been described above. FIG. 4 will be described again below.

Next, detector 13 outputs detection result information indicating the detection result to a predetermined device (step S105). The detection result information may be, for example, information indicating only presence of the obstacle, or may be information indicating in which area (for example, areas 41, 42, and 43) the obstacle is. An output destination of the detection result information may be, for example, an ECU other than the ultrasonic distance measurement ECU (for example, ECU that performs driving support of a vehicle), or may be a display device.

The operation of detection device 100 has been described above.

As described in detail, detection device 100 of the present exemplary embodiment causes ultrasonic sensor 2 to transmit successive transmission wave T with the different frequency component and coverage, and detects presence of obstacle 50 based on the frequency component extracted from the reflected wave. This allows detection device 100 to detect an obstacle in a wider range and to detect an obstacle on the road surface accurately.

The present disclosure is not limited to the exemplary embodiment described above, and various modifications are possible.

For example, the exemplary embodiment has described an example in which detection device 100 and ultrasonic sensor 2 are mounted on vehicle 1, but detection device 100 and ultrasonic sensor 2 may be mounted on a movable body other than a vehicle (automobile).

For example, the exemplary embodiment has described an example in which ultrasonic sensor 2 is mounted in a rear portion of vehicle 1 and transmits successive transmission wave T rearward of vehicle 1, but the exemplary embodiment is not limited to this example. Ultrasonic sensor 2 may be mounted, for example, on a side or front of vehicle 1, and transmit successive transmission wave T sideward or frontward of vehicle 1.

INDUSTRIAL APPLICABILITY

The present invention is suitable for a detection device, a detection method, and a detection program for detecting an obstacle.

REFERENCE MARKS IN THE DRAWINGS

1: vehicle
2: ultrasonic sensor
10: controller
11: transmission-and-reception controller (transmitter)
12: extraction unit
13: detector
20: signal transmitting circuit
30: signal receiving circuit
40: road surface
41: area (partial area)
42: area (area far from vehicle)
43: area (area close to vehicle)
50: obstacle
100: detection device
T: successive transmission wave
T1: transmission wave (first transmission wave)
T2: transmission wave (second transmission wave)
S1: coverage (coverage of first transmission wave)
S2: coverage (coverage of second transmission wave)
R1, R2, R3, R4, R5: reflected wave

The invention claimed is:

1. A detection device comprising:
a memory that stores a plurality of instructions; and
a processor that, when executing the plurality of instructions stored in the memory, performs operations, the operations including:
causing an ultrasonic sensor mounted on a vehicle to transmit successive transmission waves including a first transmission wave of a first frequency and a second transmission wave of a second frequency different from the first frequency, the second transmission wave following the first transmission wave;
extracting a frequency component from a received reflected wave of at least one of the successive transmission waves, the received reflected wave being received by the ultrasonic sensor, the received reflected wave having a reception level greater than a predetermined threshold;
detecting a presence of an obstacle based on the frequency component; and
outputting detection result information indicating a result of the detecting, at least when the obstacle is present,
wherein an amplitude level of the second transmission wave is greater than an amplitude level of the first transmission wave,
the amplitude level of the first transmission wave is set to make a reception level of a first reflected wave of the first transmission wave from a road surface less than or equal to the predetermined threshold, and
the amplitude level of the second transmission wave is set to make a reception level of a second reflected wave of the second transmission wave from a partial area of the road surface greater than the predetermined threshold.

2. The detection device according to claim 1, wherein when the processor detects the presence of the obstacle, in a case where both a first component of the first frequency and a second component of the second frequency are extracted from a reflected wave from the partial area, the processor determines that the obstacle is in the partial area.

3. The detection device according to claim 1, wherein when the processor detects the presence of the obstacle, in a case where only a second component of the second frequency is extracted from another reflected wave received after reception of a reflected wave from the partial area, the processor determines that the obstacle is in an area farther from the vehicle than the partial area, the reflected wave and the other reflected wave each being the received reflected wave of at least one of the successive transmission waves.

4. The detection device according to claim 3, wherein when the processor detects the presence of the obstacle, in a case where only the second component of the second frequency is extracted from the reflected wave from the partial area, the processor determines that the obstacle is not in the partial area.

5. The detection device according to claim 1, wherein when the processor detects the presence of the obstacle, in a case where both a first component of the first frequency and a second component of the second frequency are extracted from a reflected wave received before reception of a reflected wave from the partial area, the processor determines that the obstacle is in an area closer to the vehicle than the partial area, the reflected wave received before the reception of the reflected wave from the partial area and the other reflected wave from the partial area each being the received reflected wave of at least one of the successive transmission waves.

6. The detection device according to claim 4, wherein when the processor detects the presence of the obstacle, in a case where only the second component of the second frequency is extracted from the reflected wave from the partial area, the processor determines that the obstacle is not in the partial area.

7. The detection device according to claim 1, wherein when the processor extracts the frequency component, the processor extracts a first component of the first frequency and a second component of the second frequency as the frequency component, and
when the processor detects the presence of the obstacle, the processor detects the presence of the obstacle based on the first component of the first frequency and the second component of the second frequency.

8. The detection device according to claim 1, wherein in the detecting, the processor detects the obstacle, and
in the outputting, the detection result information indicating the result of the detecting is output, when the obstacle is detected.

9. A detection method, comprising:
causing an ultrasonic sensor mounted on a vehicle to transmit successive transmission waves including a first transmission wave of a first frequency and a second transmission wave of a second frequency different from the first frequency, the second transmission wave following the first transmission wave;

extracting a frequency component from a received reflected wave of at least one of the successive transmission waves, the received reflected wave being received by the ultrasonic sensor, the received reflected wave having a reception level greater than a predetermined threshold; and detecting a presence of an obstacle based on the frequency component, wherein an amplitude level of the second transmission wave is greater than an amplitude level of the first transmission wave, the amplitude level of the first transmission wave is set to make a reception level of a first reflected wave of the first transmission wave from a road surface less than or equal to the predetermined threshold, and the amplitude level of the second transmission wave is set to make a reception level of a second reflected wave of the second transmission wave from a partial area of the road surface greater than the predetermined threshold.

10. The detection method according to claim 9, wherein the obstacle is detected based on the frequency component.

11. A non-transitory storage medium for storing a program that, when executed, causes a computer to execute operations, the operations comprising:

causing an ultrasonic sensor mounted on a vehicle to transmit successive transmission waves including a first transmission wave of a first frequency and a second transmission wave of a second frequency different from the first frequency, the second transmission wave following the first transmission wave;

extracting a frequency component from a received reflected wave of at least one of the successive transmission waves, the received reflected wave being received by the ultrasonic sensor, the received reflected wave having a reception level greater than a predetermined threshold; and detecting a presence of an obstacle based on the frequency component, wherein an amplitude level of the second transmission wave is greater than an amplitude level of the first transmission wave, the amplitude level of the first transmission wave is set to make a reception level of a first reflected wave of the first transmission wave from a road surface less than or equal to the predetermined threshold, and the amplitude level of the second transmission wave is set to make a reception level of a second reflected wave of the second transmission wave from a partial area of the road surface greater than the predetermined threshold.

12. The non-transitory storage medium according to claim 11, wherein the obstacle is detected based on the frequency component.

13. A detection device comprising:

a memory that stores a plurality of instructions; and a processor that, when executing the plurality of instructions stored in the memory, performs operations, the operations including:

causing an ultrasonic sensor mounted on a vehicle moving with respect to a road surface to transmit successive transmission waves including a first transmission wave of a first frequency and a second transmission wave of a second frequency different from the first frequency, the second transmission wave following the first transmission wave;

extracting a frequency component from a reception signal converted from a sonic wave received by the ultrasonic sensor, the reception signal having a reception level greater than a predetermined threshold; and detecting a presence of an obstacle depending on whether the frequency component is the first frequency or the second frequency, wherein an amplitude level of the second transmission wave is greater than an amplitude level of the first transmission wave, the amplitude level of the first transmission wave is set in advance to make a reception level of a reception signal converted from a first reflected wave of the first transmission wave from the road surface less than or equal to the predetermined threshold, and the amplitude level of the second transmission wave is set in advance to make a reception level of a reception signal converted from a second reflected wave of the second transmission wave from a partial area of the road surface greater than the predetermined threshold.

14. The detection device according to claim 13, wherein when the processor detects the presence of the obstacle, in a case where both a first component of the first frequency and a second component of the second frequency are extracted from a reception signal converted from a reflected wave from the partial area, the processor determines that the obstacle is in the partial area.

15. The detection device according to claim 13, wherein the obstacle is detected depending on whether the frequency component is the first frequency or the second frequency.

* * * * *